Figure 1:
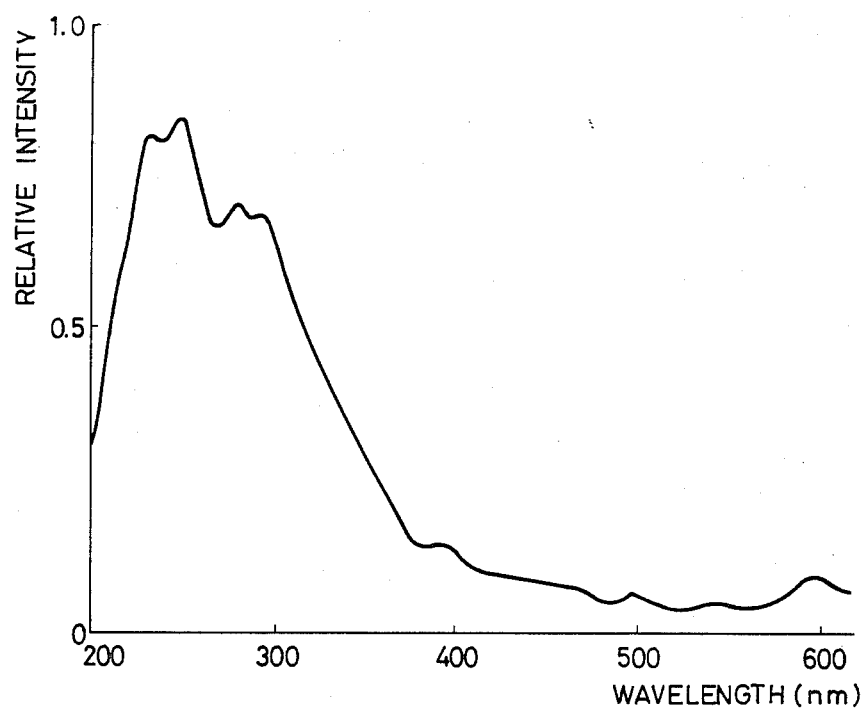

United States Patent [19]
Nogami

[11] Patent Number: 4,715,712
[45] Date of Patent: Dec. 29, 1987

[54] MULTIWAVELENGTH SPECTROPHOTOMETER

[75] Inventor: Taro Nogami, Katsuta, Japan

[73] Assignee: Hitachi, Ltd., Tokyo, Japan

[21] Appl. No.: 710,389

[22] Filed: Mar. 11, 1985

[30] Foreign Application Priority Data

Mar. 14, 1984 [JP] Japan .................................. 59-47048

[51] Int. Cl.⁴ ............................ G01J 3/42; G01J 3/36
[52] U.S. Cl. .................................................. 356/328
[58] Field of Search ................ 356/308, 326, 328, 331

[56] References Cited

U.S. PATENT DOCUMENTS

| | | | |
|---|---|---|---|
| 4,060,327 | 11/1977 | Jacobowitz et al. | 356/328 |
| 4,253,765 | 3/1981 | Kato et al. | 356/308 |
| 4,357,673 | 11/1982 | Willis et al. | 356/323 |
| 4,563,090 | 1/1986 | Witte | 356/328 |

FOREIGN PATENT DOCUMENTS

| | | | |
|---|---|---|---|
| 37223 | 3/1982 | Japan . | |
| 0060231 | 4/1982 | Japan | 356/326 |
| 139647 | 8/1982 | Japan . | |

OTHER PUBLICATIONS

Borman, *Analytical Chemistry*, vol. 55, No. 8, Jul. 1983, pp. 836A, 838A, 842A.

*Primary Examiner*—F. L. Evans
*Attorney, Agent, or Firm*—Antonelli, Terry & Wands

[57] ABSTRACT

Light from a light source is dispersed by a grating. Two multichannel light detectors are arranged for detecting the dispersed light. One light detector detects the first order of interference and the other light detector detects the second order of interference in overlapping wavelength ranges. The outputs of the two light detectors are averaged for improving the S/N ratio, particularly in wavelength ranges in which the light intensity of the light source is low.

8 Claims, 7 Drawing Figures

MULTIWAVELENGTH SPECTROPHOTOMETER

The present invention relates to a multiwavelength spectrophotometer, particularly for liquid chromatography and more particularly to a multiwavelength spectrophotometer monitoring simultaneously wavelengths of a spectrum.

In multiwavelength spectrophotometers, the sensitivity or the signal to noise ratio (S/N ratio) is worse than that of a single wavelength spectrophotometer because the sensitivity of a multichannel light detector formed by a photodiode array used in the multiwavelength spectrophotometer is worse than that of a single channel light detector formed by a single photodiode or photomultiplier used in the single wavelength spectrophotometer due to interface defects between neighbouring photodiodes in the photodiode array of the multichannel light detector. The S/N ratio of the multiwavelength spectrophotometer is particularly very low in the wavelength range of low intensity of a light source. Some known multiwavelength spectrophotometers, described for example in Analytical Chemistry, Volume 55, No. 8, July 1983, pp. 836A, 838A and 842A, offer the following solutions for reducing this disadvantage.

One known spectrophotometer uses successively two kinds of light sources, for example a deuterium lamp ($D_2$ lamp) for the ultraviolet wavelength range of a tungsten lamp (W lamp) for the visible wavelength range, respectively. This spectrophotometer, however, is quite expensive and operates quite slowly because the different wavelengths cannot be measured simultaneously but only successively.

Another known spectrophotometer using a $D_2$ lamp reduces the S/N ratio in the visible wavelength range by a data processing, called "wavelength bunching" which is an integration of all signals between two present wavelengths. Hereby, however, the wavelength resolution is deteriorated.

The object of the present invention is to eliminate the disadvantages of the known multiwavelength spectrophotometer and to provide a multiwavelength spectrophotometer with a high S/N ratio.

This object is solved according to the invention by a multiwavelength spectrophotometer, particularly for liquid chromatography comprising a light source, a sample cell, a grating for dispersing a light beam from the light source, a first multichannel light detector for detecting light dispersed by the grating in a first wavelength range, a second multichannel light detector for detecting light dispersed by the grating in a second wavelength range overlapping at least partly said first wavelength range, the light detected by the second multichannel light detector having a different order of interference in comparison to the order of interference of said light detected by said first multichannel light detector, and a processor for averaging output signals of each of the first and second light detectors.

The inventive spectrophotometer eliminates the additional expenses of a second light source, the low operation speed of a successively monitoring spectrophotometer and the low wavelength resolution of the known spectrophotometers as mentioned above and improves the S/N ratio, especially in the wavelength range in which the light intensity of the light source is low.

Figure 2:
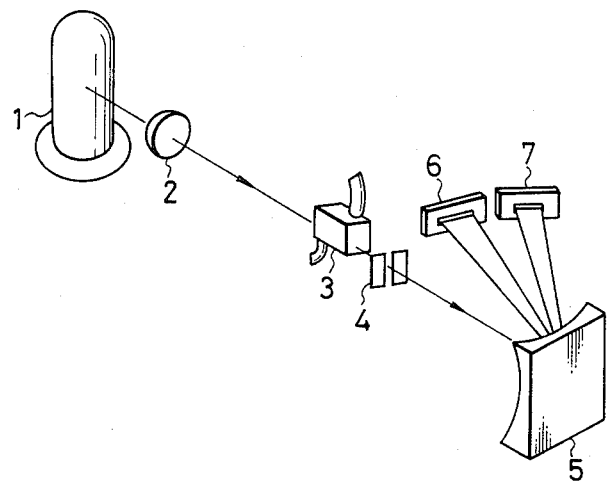
Figure 3:
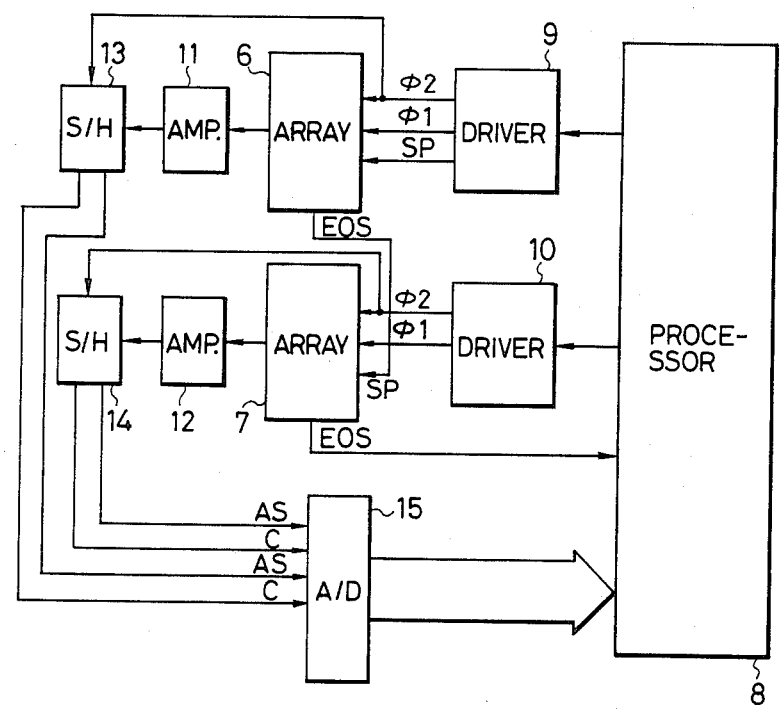
Figure 4:
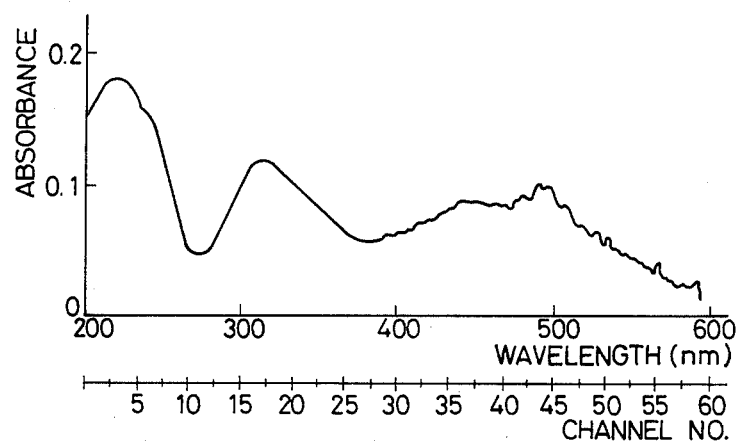
Figure 5:
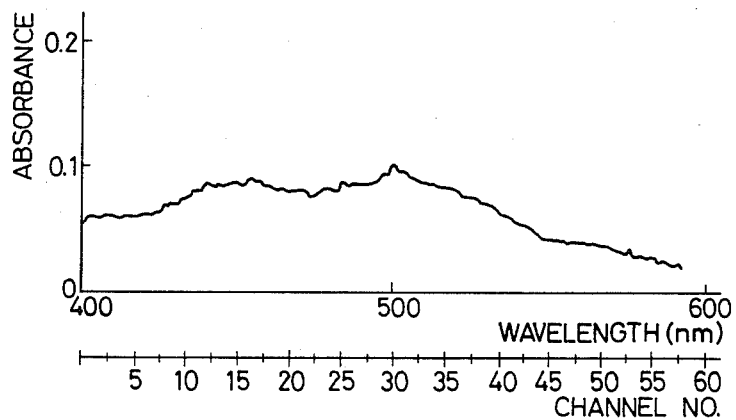
Figure 6:
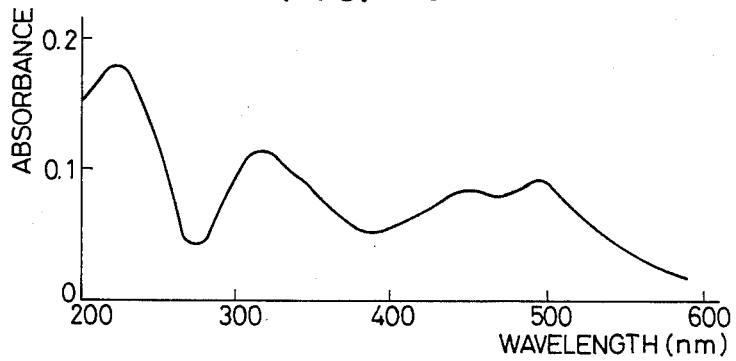
Figure 7:
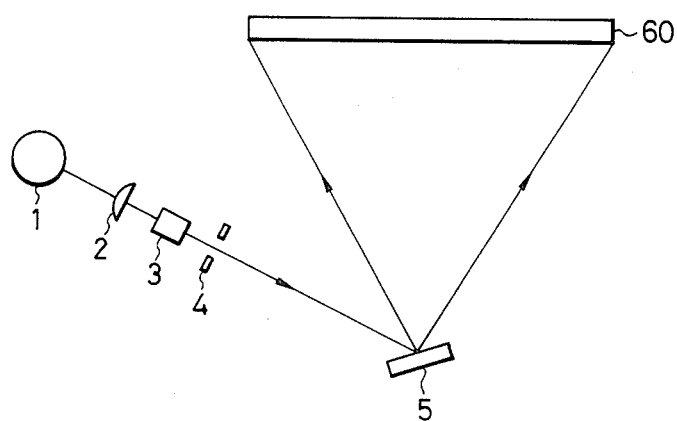

Advantageous embodiments of the present invention are described below in connection with the drawings wherein FIG. 1 is a graph showing the intensity versus wavelength diagram of a light source consisting of a $D_2$ lamp, FIG. 2 is a diagrammatic view of the optical system of an embodiment of the spectrophotometer according to the invention, FIG. 3 is a block diagramm of an electrical circuit for processing the signals from the two light detectors of the spectrophotometer according to the invention, FIGS. 4 and 5 are graphs showing the absorption spectra of a sample measured by the first and second light detector of the spectrophotometer according to the invention, FIG. 6 is a graph deducted from the graphs of FIGS. 4 and 5 after the inventive averaging operation, and FIG. 7 is a diagrammatic view of an optical system of another embodiment of the spectrophotometer according to the invention.

FIG. 1 shows the intensity versus wavelength diagram of a $D_2$ lamp measured by using a silicon photodiode array as light detector. The light intensity of a $D_2$ lamp is quite low in the visible wavelength range, i.e. in the range above about 400 nm. As a result of this characteristic, the signals of a sample measured for example in a liquid chromatograph using such a $D_2$ lamp have generally a low S/N ratio in the visible wavelength range.

FIG. 2 shows an optical system of the spectrophotometer comprising a light source 1, a condensor lens 2, a flow cell 3 and a monochromater formed by an entrance slit 4, a concave grating 5 and two multichannel light detectors consisting of two silicon photodiode arrays 6 and 7. The light beam is dispersed by the concave grating 5. Normally, the first order of interference in a first wavelength range is detected simultaneously by the silicon photodiode array 6. The array 7 detects simultaneously the second order of interference in a second wavelength range overlapping at least partly the first wavelength range.

As the second order of interference has a dispersion twice that of the first order of interference and as the photodiode array 7 detects half of the wavelength range of the wavelength range detected by the photodiode array 6, the same type of photodiode array can be used for both photodiode array 6 and 7.

In FIG. 3, drivers 9 and 10 produce driving pulses $\phi_1$ and $\phi_2$ driving the photodiode arrays 6 and 7 respectively by corresponding command signals from a processor 8. The driver 9 supplies further a start pulse SP to the photodiode array 6. A wavelength scan end pulse (End of Scan) EOS is supplied from the photodiode array 6 to the photodiode array 7 as a start pulse for the photodiode array 7 and from the photodiode array 7 to the processor 8. The output signals (Array Signal) AS of the photodiode array 6 and 7 are supplied to an A/D converter 15 through amplifiers 11 and 12 and sample and hold circuits 13 and 14. Command signals C are also supplied to the A/D converter 15. The output signals AS are converted to digital signals by the A/D converter 15 in response to the command signals C and read into the processor 8.

FIG. 4 shows an example of the first order of interference of an absorption spectrum of a liquid sample which is measured in a chromatograph by the photodiode array 6 in the wavelength range from 200 to 600 nm. Large noises are indicated in the wavelength range of more than 400 nm in which the light intensity of the $D_2$ lamp is low.

FIG. 5 shows an example of the second order of interference of an absorption spectrum of the same liquid sample which is measured by the photodiode array 7 in the wavelength range from 400 to 600 nm.

The processor 8 performs a smoothing or averaging operation for the output signals of the photodiode arrays 6 and 7 as shown in FIGS. 4 and 5 in two steps as follows so as to provide a resultant output signal with improved S/N ratio as shown in FIG. 6.

Let the output signals for the channels 1, 2, 3, ..., 60 of the photodiode array 7 be B(1), B(2), ..., B(60). The first step of the averaging operating is obtained by averaging the output signals of two neighbouring channels as $$\frac{B(1) + B(2)}{2}, \frac{B(3) + B(4)}{2}, \ldots, \frac{B(59) + B(60)}{2}.$$

Those obtained signals have essentially the same wavelength resolution of 6 nm as the output signals of each channel of the photodiode array 6 as can be taken from the following.

For the second step of the averaging operation, let the output signals of the channels 1, 2, 3 ..., 60 of the photodiode array 6 be A(1), A(2), A3), ..., A(60). The output signals A(31), A(32), ...., A(60) indicate the spectrum signals of more than 400 nm. The average signals obtained by the second step of the averaging operation are $$\frac{A(31) + \frac{B(1) + B(2)}{2}}{2}, \frac{A(32) + \frac{B(3) + B(4)}{2}}{2}, \ldots,$$

$$\frac{A(60) + \frac{B(59) + B(60)}{2}}{2}.$$

In accordance with the present invention, the two light detectors (6, 7) may be identical photodiode arrays and the averaging of the output signals of the photodiode arrays (6, 7) follows the following formula utilizing weighting factors:

$$\frac{k_1 A + k_2 \frac{(B(1) + B(2))}{2}}{k_1 + k_2}$$

whereby,

A is the output signal of a photodiode of the first array (6) covering a predetermined wavelength range, B(1) and B(2) are the output signals of two neighboring photodiodes of the second array (7) covering together the same predetermined wavelength range and $k_1$, $k_2$ are weighting factors for the output signals A and $$\frac{B(1) + B(2))}{2}.$$

Furthermore, in accordance with another embodiment of the present invention as illustrated in FIG. 7, the light detector 6 and the light detector 7 as shown in FIG. 1 are constructed integrally as one single light detector 60, whereby a part of the one single light detector detects one order of interference and the other part detects another order of interference. As shown, the light detector 60 has 150 channels.

I claim:

1. A multiwavelength spectrophotometer, particularly for liquid chromatography comprising a light source, a sample cell, a grating for dispersing a light beam from said light source, a first multichannel light detector means for detecting light dispersed by said grating in a first wavelength range, a second multichannel light detector means for detecting light dispersed by said grating in a second wavelength range overlapping at least partly said first wavelength range, said light detected by said second multichannel light detector means having a different order of interference in comparison to the order of interference of said light detected by said first multichannel light detector means, and a processor means for combining output signals of each of said first and second light detector means so as to provide output signals with an improved S/N ratio at least in the second wavelength range, said processor means enabling averaging of an output signal of each of said first and second light detector means.

2. A spectrophotometer as claimed in claim 1, characterized in that said second light detector means is arranged for detecting the light in a wavelength range in which the light intensity of said light source is low.

3. A spectrophotometer as claimed in claim 1, characterized in that said first light detector means detects the first order of interference and that said second light detector means detects the second order of interference.

4. A spectrophotometer as claimed in claim 1, characterized in that said light source is a deuterium lamp, said first light detector means detects the first order of interference of the ultraviolet and visible wavelength ranges and said second light detector means detects the second order of interference of the visible wavelength range.

5. A spectrophotometer as claimed in claim 4, characterized in that said first light detector means detects the light in a wavelength range from 200 to 600 nm and said second light detector means detects the light in a wavelength range from 400 to 600 nm.

6. A spectrophotometer as claimed in one of claims 2 to 5, characterized in that the first and second light detector means are identical first and second photodiode arrays and that the averaging of the output signals of the first and second photodiode arrays follows the formula $$\frac{k_1 A + k_2 \frac{(B(1) + B(2))}{2}}{k_1 + k_2}$$

whereby,

A is the output signal of a photodiode of the first array covering a predetermined wavelength range B(1) and B(2) are the output signals of two neighboring photodiodes of the second array covering together the same predetermined range and $k_1$, $k_2$ are weight factors for the output signals A and $$\frac{B(1) + B(2))}{2}.$$

7. A spectrophotometer as claimed in one of claims 1 to 5, characterized in that said first light detector means and said second light detector means are constructed integrally as one single light detector, whereby a part of said one single light detector detects one order of interference and the other part detects another order of interference.

8. A multiwavelength spectrophotometer, particularly for liquid chromatography comprising a light source, a sample cell, a grating for dispersing a light beam from said light source, a first multichannel light detector means for detecting light dispersed by said grating in a first wavelength range, a second multichannel light detector means for detecting light dispersed by said grating in a second wavelength range overlapping at least partly said first wavelength range, said light detected by said second multichannel light detector means having a different order of interference in comparison to the order of interference of said light detected by said first multichannel light detector means, and a processor means for averaging output signals of each of said first and second light detector means so as to provide output signals with an improved S/N ratio at least in the second wavelength range, the first and second light detector means being identical first and second photodiode arrays and the averaging of the output signals of the first and second photodiode arrays following the formula $$\frac{k_1 A + k_2 \frac{(B(1) + B(2))}{2}}{k_1 + k_2}$$

whereby,

A is the output signal of a photodiode of the first array covering a predetermined wavelength range, $B(1)$ and $B(2)$ are the output signals of two neighboring photodiodes of the second array covering together the same predetermined range and $k_1$, $k_2$ are weight factors for the output signals A and $$\frac{B(1) + B(2))}{2}.$$

* * * * *